US009135521B2

(12) United States Patent
Lim et al.

(10) Patent No.: US 9,135,521 B2
(45) Date of Patent: Sep. 15, 2015

(54) IMAGE PROCESSING APPARATUS AND METHOD FOR DETERMINING THE INTEGRAL IMAGE

(75) Inventors: Hwa Sup Lim, Hwaseong-si (KR); Kee Chang Lee, Yongin-si (KR); Byong-Min Kang, Yongin-si (KR); In Cheol Park, Daejeong-si (KR); Jeong Ho Han, Seoul (KR); Hye Yeon Shim, Kimcheon-si (KR)

(73) Assignees: Samsung Electronics Co., Ltd., Gyeonggi-Do (KR); Korea Advanced Institute of Science and Technology, Daejeon (KR)

(*) Notice: Subject to any disclaimer, the term of this patent is extended or adjusted under 35 U.S.C. 154(b) by 1266 days.

(21) Appl. No.: 12/453,121

(22) Filed: Apr. 29, 2009

(65) Prior Publication Data
US 2010/0111446 A1 May 6, 2010

(30) Foreign Application Priority Data

Oct. 31, 2008 (KR) .................. 10-2008-0108105

(51) Int. Cl.
    *G06K 9/36* (2006.01)
    *G06K 9/46* (2006.01)
    *H04N 19/17* (2014.01)
    (Continued)

(52) U.S. Cl.
CPC .............. *G06K 9/4647* (2013.01); *H04N 19/17* (2014.11); *H04N 19/43* (2014.11); *H04N 19/433* (2014.11); *H04N 19/543* (2014.11)

(58) Field of Classification Search
CPC .................................................. G06K 8/4614
USPC ................................................. 382/276, 305
See application file for complete search history.

(56) References Cited

U.S. PATENT DOCUMENTS 5,278,920 A * 1/1994 Bernzott et al. .............. 382/176
5,745,178 A * 4/1998 Hartung et al. .......... 375/240.04
(Continued)

FOREIGN PATENT DOCUMENTS

JP     2008-102792     5/2008
KR   10-2006-0096596     9/2006
(Continued)

OTHER PUBLICATIONS

Crow, Franklin (1984). "Summed-area tables for texture mapping" (http://www.soe.ucsc.edu/classes/cmps160/Fall05/papers/p207-crow.pdf) . SIGGRAPH '84: Proceedings of the 11th annual conference on Computer graphics and interactive techniques. pp. 207-212.*

(Continued)

*Primary Examiner* — Gandhi Thirugnanam
(74) *Attorney, Agent, or Firm* — Harness, Dickey & Pierce, P.L.C.

(57) ABSTRACT

An image processing apparatus and method are provided. A control unit may divide input image array data into a plurality of sub-blocks, and a first arithmetic logic unit (ALU) may generate an integral image of at least one of the plurality of sub-blocks. The control unit may determine each of the plurality of sub-blocks to be included in any one of a first sub-block group and a second sub-block group, store the integral image of each sub-block included in the first sub-block group on the first memory, and store the integral image of each sub-block included in the second sub-block group on the second memory.

10 Claims, 5 Drawing Sheets

(51) Int. Cl.
*H04N 19/43* (2014.01)
*H04N 19/433* (2014.01)
*H04N 19/543* (2014.01)

(56) References Cited

U.S. PATENT DOCUMENTS

| | | | | |
|---|---|---|---|---|
| 5,801,708 | A * | 9/1998 | Alcorn et al. | 345/587 |
| 6,031,934 | A * | 2/2000 | Ahmad et al. | 382/154 |
| 6,466,223 | B1 * | 10/2002 | Dorbie et al. | 345/582 |
| 6,493,039 | B1 * | 12/2002 | Harrington | 348/618 |
| 6,507,676 | B1 * | 1/2003 | Harrington | 382/276 |
| 6,559,858 | B1 * | 5/2003 | Schneider et al. | 345/611 |
| 6,724,396 | B1 * | 4/2004 | Emmot et al. | 345/587 |
| 6,864,994 | B1 * | 3/2005 | Harrington | 358/1.9 |
| 7,099,510 | B2 * | 8/2006 | Jones et al. | 382/225 |
| 7,158,657 | B2 * | 1/2007 | Okazaki et al. | 382/118 |
| 7,315,631 | B1 * | 1/2008 | Corcoran et al. | 382/118 |
| 7,928,988 | B1 * | 4/2011 | Levas | 345/537 |
| 7,995,820 | B2 * | 8/2011 | de Barros Carneiro et al. | 382/128 |
| 8,165,401 | B2 * | 4/2012 | Funayama et al. | 382/190 |
| 8,200,020 | B1 * | 6/2012 | Geiss et al. | 382/190 |
| 8,243,167 | B2 * | 8/2012 | Liang et al. | 348/230.1 |
| 8,279,264 | B2 * | 10/2012 | Moon et al. | 348/36 |
| 2001/0043227 | A1 * | 11/2001 | Shaw | 345/582 |
| 2002/0102024 | A1 * | 8/2002 | Jones et al. | 382/225 |
| 2002/0122605 | A1 * | 9/2002 | Chang | 382/284 |
| 2002/0172433 | A1 * | 11/2002 | Edwards | 382/294 |
| 2002/0176610 | A1 * | 11/2002 | Okazaki et al. | 382/118 |
| 2003/0108244 | A1 * | 6/2003 | Li et al. | 382/227 |
| 2003/0202105 | A1 * | 10/2003 | Gaubatz et al. | 348/207.99 |
| 2004/0179719 | A1 * | 9/2004 | Chen et al. | 382/118 |
| 2005/0013479 | A1 * | 1/2005 | Xiao et al. | 382/159 |
| 2006/0062455 | A1 * | 3/2006 | Chiu et al. | 382/173 |
| 2006/0120572 | A1 * | 6/2006 | Li et al. | 382/118 |
| 2006/0126938 | A1 * | 6/2006 | Lee et al. | 382/190 |
| 2007/0133878 | A1 * | 6/2007 | Porikli et al. | 382/190 |
| 2007/0154095 | A1 * | 7/2007 | Cao et al. | 382/190 |
| 2007/0160266 | A1 * | 7/2007 | Jones et al. | 382/117 |
| 2007/0160267 | A1 * | 7/2007 | Jones et al. | 382/117 |
| 2007/0160308 | A1 * | 7/2007 | Jones et al. | 382/260 |
| 2007/0171439 | A1 * | 7/2007 | Kakutani | 358/1.9 |
| 2007/0237387 | A1 * | 10/2007 | Avidan et al. | 382/159 |
| 2008/0037827 | A1 * | 2/2008 | Corcoran et al. | 382/103 |
| 2008/0037839 | A1 * | 2/2008 | Corcoran et al. | 382/118 |
| 2008/0037840 | A1 * | 2/2008 | Steinberg et al. | 382/118 |
| 2008/0080744 | A1 * | 4/2008 | Tanaka | 382/118 |
| 2008/0166016 | A1 * | 7/2008 | Sibiryakov et al. | 382/103 |
| 2008/0187186 | A1 * | 8/2008 | Togashi | 382/118 |
| 2008/0193020 | A1 * | 8/2008 | Sibiryakov et al. | 382/209 |
| 2008/0219517 | A1 * | 9/2008 | Blonk et al. | 382/118 |
| 2008/0219558 | A1 * | 9/2008 | Lu et al. | 382/190 |
| 2008/0252717 | A1 * | 10/2008 | Moon et al. | 348/36 |
| 2008/0267461 | A1 * | 10/2008 | Ianculescu et al. | 382/118 |
| 2008/0285849 | A1 * | 11/2008 | Lu et al. | 382/166 |
| 2009/0058990 | A1 * | 3/2009 | Kim et al. | 348/36 |
| 2009/0060277 | A1 * | 3/2009 | Zhang et al. | 382/103 |
| 2009/0161967 | A1 * | 6/2009 | Li et al. | 382/210 |
| 2009/0185753 | A1 * | 7/2009 | Albu et al. | 382/260 |
| 2009/0232365 | A1 * | 9/2009 | Berthilsson et al. | 382/118 |
| 2009/0285473 | A1 * | 11/2009 | Li et al. | 382/159 |
| 2010/0053368 | A1 * | 3/2010 | Nanu et al. | 348/224.1 |
| 2010/0111446 | A1 * | 5/2010 | Lim et al. | 382/305 |
| 2010/0180189 | A1 * | 7/2010 | Ito et al. | 715/219 |
| 2010/0245374 | A1 * | 9/2010 | Iourcha et al. | 345/586 |
| 2011/0058741 | A1 * | 3/2011 | Ito et al. | 382/173 |
| 2011/0102643 | A1 * | 5/2011 | Nanu et al. | 348/241 |
| 2011/0158544 | A1 * | 6/2011 | Hashiguchi | 382/201 |
| 2011/0293190 | A1 * | 12/2011 | O'Callaghan | 382/197 |
| 2012/0033083 | A1 * | 2/2012 | Horbinger et al. | 348/159 |
| 2012/0051648 | A1 * | 3/2012 | Hashiguchi | 382/192 |
| 2012/0134586 | A1 * | 5/2012 | Pajaniradja et al. | 382/170 |
| 2012/0207358 | A1 * | 8/2012 | Blonk et al. | 382/118 |
| 2013/0343653 | A1 * | 12/2013 | Hashiguchi | 382/190 |

FOREIGN PATENT DOCUMENTS

| | | |
|---|---|---|
| KR | 10-0764382 | 9/2007 |
| KR | 10-2007-0104213 | 10/2007 |
| KR | 10-2008-0068716 | 7/2008 |

OTHER PUBLICATIONS

Viola, Paul; Jones, Michael (2002). "Robust Real-time Object Detection" (http://research.microsoft.com/~viola/Pubs/Detect/violaJones_IJCV.pdf) . International Journal of Computer Vision.*

Wei-Su Wong, "A 100MHz hardware-efficient boost cascaded face detection design", 2009, Image Processing (ICIP), 2009 16th IEEE International Conference on, p. 3237-3240.*

Wikipedia, "Summed area table", 2012, http://en.wikipedia.org/wiki/Summed_Area_Table, p. 1-3.*

H.J.W Belt, "Storage Size Reduction for the Integral Image", 2007, Koninklijke Philips Electronics N.V, Technical note TN-2007/00784, p. 1-38.*

Franklin Crow, "Summed-area Tables for Texture Mapping", Jul. 1984, Computer Graphics, vol. 18, No. 3, p. 207-212.*

Sauer, K et al.., "Efficient Block Motion Estimation using Integral Projections", Oct. 1996, IEEE Transactions on Circuits and Systems for Video Technology, vol. 6 No. 5, p. 513-518.*

Korean Office Action issued Jun. 20, 2014 in corresponding Korean Application No. 10-2008-0108105.

* cited by examiner

FIG. 5

IMAGE PROCESSING APPARATUS AND METHOD FOR DETERMINING THE INTEGRAL IMAGE

CROSS-REFERENCE TO RELATED APPLICATIONS

This application claims the benefit of Korean Patent Application No. 10-2008-0108105, filed on Oct. 31, 2008, in the Korean Intellectual Property Office, the disclosure of which is incorporated herein by reference.

BACKGROUND

1. Field

Example embodiments relate to an image signal processing, and more particularly, to an apparatus and method which efficiently generates and stores an integral image of an input image, and calculates a sum of data within a Region of Interest (ROI) of image data using the integral image.

2. Description of the Related Art

An integral image technique has been provided in the field of image-matching and image compression by motion estimation among a plurality of frames of an image.

The integral image technique may store accumulated values of entire images. The entire images may generally correspond to array data. An integral image is useful for calculating a sum of all data values within a Region of Interest (ROI) of an image. Also, an integral image may improve an efficiency of calculation used for an image processing such as a Sum of Absolute Difference (SAD) and Sum of Squared Difference (SSD).

However, since an integral image technique stores accumulated values of entire images in an individual cell, a capacity of an individual cell is to be large. Accordingly, a large amount of memory is required to store an integral image. Also, as a size of an image, that is, a total number of pixels, increases, a larger memory size is required to store an integral image. Thus, an integral image technique has been embodied in software only.

SUMMARY

Additional aspects and/or advantages will be set forth in part in the description which follows and, in part, will be apparent from the description, or may be learned by practice of the invention.

Example embodiments may provide an image processing apparatus and method which may effectively reduce a memory size required to generate and store an integral image technique.

Example embodiments may also provide an image processing apparatus and method which improve a speed of image processing with respect to input image data using an integral image.

According to example embodiments, there may be provided an image processing apparatus, including: a control unit to divide input image array data into a plurality of sub-blocks; and a first arithmetic logic unit (ALU) to generate an integral image of at least one of the plurality of sub-blocks.

The image processing apparatus may further include a first memory and a second memory. The control unit may determine each of the plurality of sub-blocks to be included in any one of a first sub-block group and a second sub-block group, store the integral image of each sub-block included in the first sub-block group on the first memory, and store the integral image of each sub-block included in the second sub-block group on the second memory.

The image processing apparatus may further include a first buffer memory to store an integral value of a bottom row of the integral image of each sub-block included in the first sub-block group, and an integral value of a bottom row of the integral image of each sub-block included in the second sub-block group.

The image processing apparatus may further include a second ALU to calculate a sum of data within a Region of Interest (ROI). The ROI may be determined within the input image array data, and the sum of data within the ROI may be calculated as a sum of data values of each cell in the ROI.

When the image processing apparatus calculates the sum of data within the ROI, the control unit may retrieve an object sub-block including at least one of cells in the ROI, select a cell required to calculate the sum of data within the ROI from cells of the object sub-block, and read an integral value of the required cell from the first memory and the second memory, and the second ALU may calculate the sum of data within the ROI based on the read integral value.

The image processing apparatus may further include a plurality of delay units. The control unit may provide a first number of integral values, read at a first clock, to the plurality of delay units, and read a second number of integral values at a second clock, and the second ALU may calculate the sum of data within the ROI based on the first number of integral values provided from the plurality of delay units and the second number of integral values read from the control unit. In this instance, the first number and the second number are greater than one.

According to other example embodiments, an image processing apparatus, including: an ALU to receive a data value of a first cell of the input image array data, $f(x, y)$, an integral value of a left cell of the first cell, $l(x-1, y)$, an integral value of a upper cell of the first cell, $l(x, y-1)$, and an integral value of a cell neighboring to the cells, $l(x-1, y-1)$, to calculate an integral value of the first cell, $l(x, y)$, $l(x, y)=f(x, y)+l(x-1, y)+l(x, y-1)-l(x-1, y-1)$, and to provide the integral value of the first cell, x denoting a row and being a positive integer, and y denoting a column and being a positive integer; a first buffer memory to receive and store the integral value of the first cell, $l(x, y)$, from the ALU, and provide the integral value of the upper cell of the first cell, $l(x, y-1)$; a first delay unit to receive the integral value of the upper cell of the first cell, $l(x, y-1)$, from the first buffer memory, delay the integral value, $l(x, y-1)$, and provide the integral value of the cell neighboring to the cells, $l(x-1, y-1)$, to the ALU; and a second delay unit to receive the integral value of the first cell, $l(x, y)$, from the ALU, delay the integral value of the first cell, $l(x, y)$, and provide the integral value of the left cell of the first cell, $l(x-1, y)$, to the ALU is provided.

According to still other example embodiments, there may be provided an image processing method, including: receiving image array data; dividing the image array data into a plurality of sub-blocks; and generating an integral image of at least one of the plurality of sub-blocks.

The image processing method may further include: determining each of the plurality of sub-blocks to be included in any one of a first sub-block group and a second sub-block group; storing an integral image of each sub-block included in the first sub-block group on a first memory, and storing an integral image of each sub-block included on the second sub-block group on a second memory; and storing a bottom row of the integral image of each sub-block included in the first sub-block group, and a bottom row of the integral image of each sub-block included on the second sub-block group, in a first buffer memory.

The image processing method may further include: selecting an ROI within the image array data; and calculating a sum of data within the ROI, the sum of data within the ROI being calculated as a sum of data values of each cell in the ROI. The calculating may include: retrieving an object sub-block including at least one cell in the ROI; and calculating and summing sum of data of a region overlapping the ROI in an integral image of the retrieved object sub-block.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION OF EMBODIMENTS

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
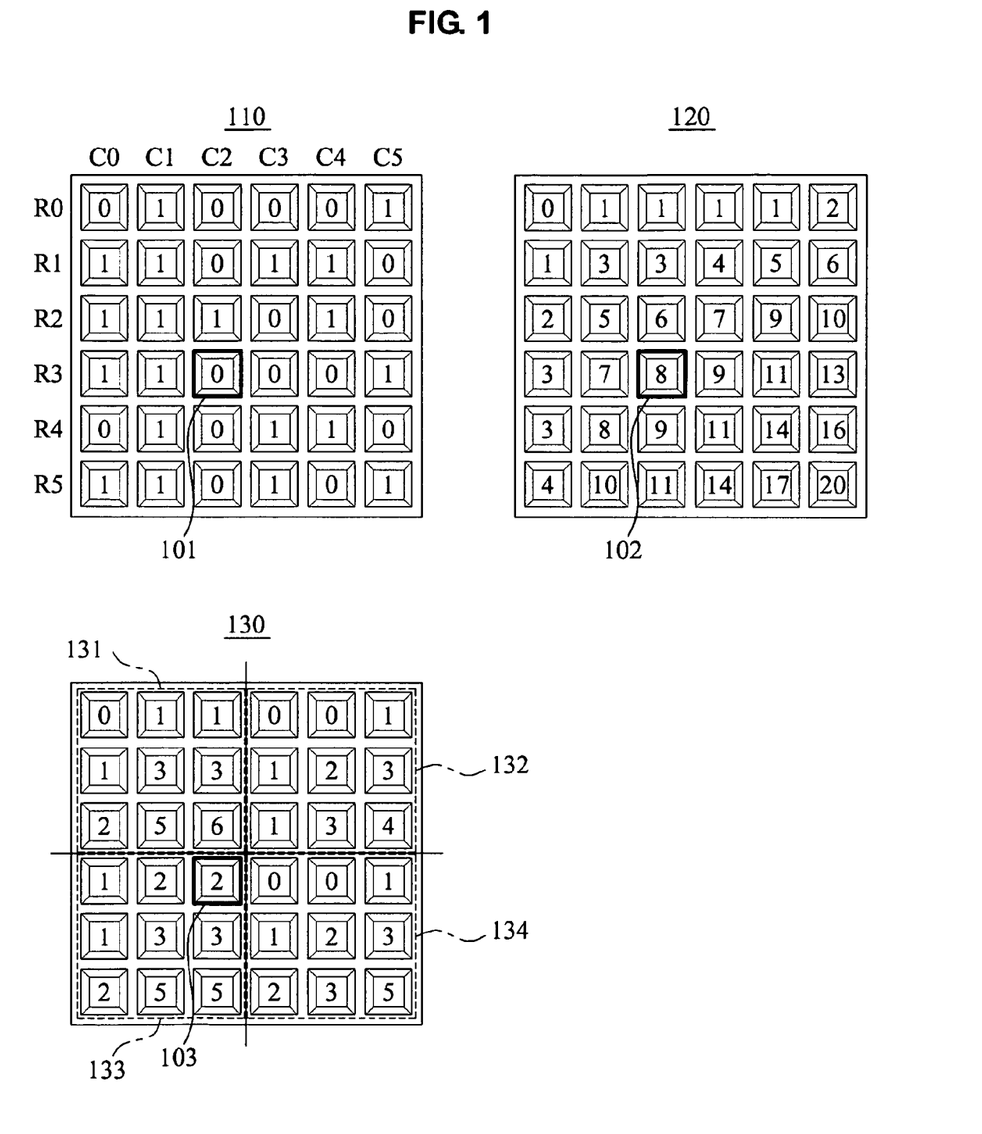
FIG. 1 is a diagram illustrating input image array data and an integral image of each sub-block with respect to an input image according to example embodiments.

FIG. 1 is a diagram illustrating input image array data and an integral image of each sub-block with respect to an input image according to example embodiments.

Array data 110 may be array data of an input image according to example embodiments. A value of each cell of the array data 110 may correspond to a value of each pixel of the input image, for example, a luminance, Red, Green, Blue (RGB) value, and brightness. For convenience of description, the value of each cell is illustrated as 0 or 1. Specifically, a data width may be one bit. However, it is understood that the value of each cell is not limited thereto.

An integral image 120 may be a result of processing the array data 110. The array data 110 may be calculated as, $$I(x, y) = \sum_{j=0}^{y} \sum_{i=0}^{x} f(i, j).$$  [Equation 1]

For example, an integral value of a cell 101 in a row R3 and a column C2 may be eight (0+1+0+1+1+0+1+1+1+1++1=8)

in the array data 110. Accordingly, a value of a cell 102 may be eight in the integral image 120.

The array data 110 may be divided into four sub-blocks 131, 132, 133, and 134. An integral image 130 may be acquired by obtaining an integral image of each of the four sub-blocks 131, 132, 133, and 134. According to example embodiments, although the integral value corresponding to the cell 101 of the array data 110 is eight as illustrated in the cell 102 of the integral image 120, an integral value of a cell 103 of the integral image 130 is two, as illustrated in FIG. 1.

When comparing the integral image 120 and the integral image 130, as a column number and a row number increase in the integral image 120, an integral value in a corresponding location of the integral image 120 may increase or remain the same. However, as a column number and a row number increase in the integral image 130, an integral value in a corresponding location of the integral image 130 may increase or remain the same within a sub-block, and may decrease between sub-blocks. Accordingly, although a maximum integral value of the integral image 120 is 20, a maximum integral value of the integral image 130 may not reach 20. Thus, for the integral image 120, a theoretical maximum integral value of 36 may be reached at the bottom right cell, while for the integral image 130, a theoretical maximum integral value of 9 may be reached at the bottom right cell of each sub-block.

Also, a memory size to store the array data 110 or integral image 120 and 130 may be calculated as, Memory Size(bits)=(# of bits/cell)*ROW*COL  [Equation 2]

where "# of bits/cell" may denote a number of bits of a single cell, ROW may denote a number of rows, and COL may denote a number of columns.

In the array data 110, "# of bits/cell" may be one as a data width, and ROW and COL may be six, respectively. Accordingly, a required memory size may be 36 bits.

However, each cell of an integral image is required to have a size to store a sum of all cell values of input array data. Accordingly, "# of bits/cell" to store the integral image is to be increased as, # of bits/cell=[Log$_2$(ROW*COL)]+data width  [Equation 3]

In the integral image 120, since "# of bits/cell" may be calculated as (Log$_2$(6*6)+1), seven bits are required. Accordingly, an entire memory size may be 252 bits (7*(6*6)).

However, in the integral image 130, each cell is required to have a size to store a sum of all cell values of any one of the sub-blocks 131, 132, 133, and 134. Accordingly, "# of bits/cell" may be (Log$_2$(3*3)+1), that is, five. Also, since an entire memory size may be calculated as 5*(6*6), 180 bits are required.

TABLE 1

| | Memory size to store an integral image | |
|---|---|---|
| Image size (Here, one pixel of input array data uses eight bits) | When array data is not divided into sub-blocks | When array data is divided into sub-blocks (32 cell * 32 cell) (in comparison to when array data is not divided) |
| QCIF (176 * 144) | 446.8 KB | 329.5 KB (73.7%) |
| QVGA (320 * 240) | 1477 KB | 998.4 KB (67.6%) |
| CIF (352 * 288) | 1.99 MB | 1.32 MB (66.3%) |
| VGA (640 * 480) | 6.521 MB | 3.994 MB (61.2%) |

Figure 2:
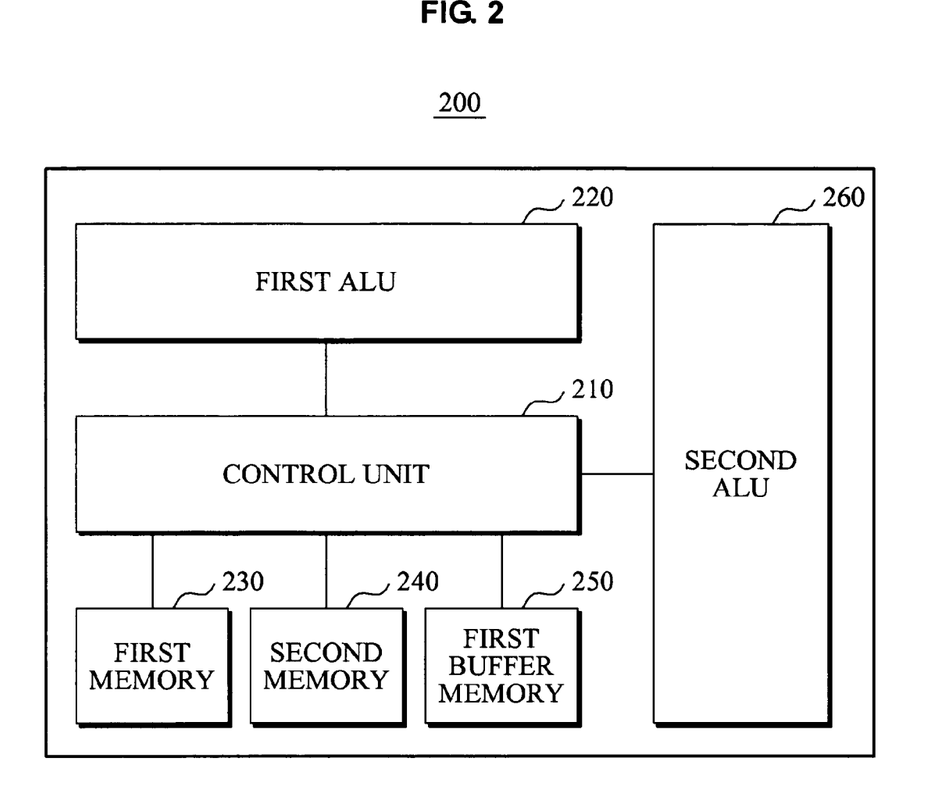
FIG. 2 is a block diagram illustrating an image processing apparatus according to example embodiments.

FIG. 2 is a block diagram illustrating an image processing apparatus according to example embodiments.

Input image array data 110 of FIG. 1 is received in a control unit 210. The control unit 210 may divide the array data 110 into a plurality of sub-blocks 131, 132, 133, and 134. According to example embodiments, although a size of each of the plurality of sub-blocks 131, 132, 133, and 134 is 3*3, the size may not be limited to the example embodiments.

Also, the control unit 210 may provide a data value of each of the plurality of sub-blocks 131, 132, 133, and 134 to a first arithmetic logic unit (ALU) 220. The first ALU 220 may calculate an integral image of each of the plurality of sub-blocks 131, 132, 133, and 134.

According to example embodiments, each integral image calculated by the first ALU 220 may be stored in a single memory structure. According to other example embodiments, however, an integral image of each of a first number of sub-blocks may be stored in a first memory structure 230, and an integral image of each of a second number of sub-blocks may be stored in a second memory structure 240. The first number and the second number are greater than one. Also, an integral image of each sub-block may be stored in a greater number of memory.

Also, a bottom row of an integral image of each sub-block may be separately stored in a first buffer memory 250. In FIG. 1, a bottom row (2, 5, 6) of the sub-block 131, a bottom row (1, 3, 4) of the sub-block 132, a bottom row (2, 5, 5) of the sub-block 133, and a bottom row (2, 3, 5) of the sub-block 134 may be separately stored in the first buffer memory 250.

When an integral image of a plurality of sub-blocks is stored in a single memory, a number of integral values which may be read from the integral image at every clock may be limited. For example, the number of integral values that may be read at each clock may be limited to two. However, when the integral image of the plurality of sub-blocks is stored in at least two memories according to a predetermined condition, the number of integral values which may be read at each clock may be increased.

For example, the integral images of the first number of sub-blocks may be the integral images of the sub-block 131 and the sub-block 133, and the integral images of the second number of sub-blocks may be the integral images of the sub-block 132 and the sub-block 134.

In image processing, a sum of data values of a particular region within array data, specifically, a sum of data within a Region of Interest (ROI), may be calculated as described above. For example, a particular region within the array data 110 of FIG. 1 may be designated as an ROI, and data values of all pixels within the ROI may be summed. In this instance, the sum of data within the ROI may be indirectly calculated by reading required integral values from the integral image 130, without reading the data values of all the pixels within the ROI from the array data 110.

In this instance, the control unit 210 may determine which sub-block is an object sub-block. The object sub-block may indicate a sub-block overlapping the ROI. Also, the control unit 210 may determine which integral value is to be read in the object sub-block.

Also, the control unit 210 may read the integral value from the first memory 230, the second memory 240, and the first buffer memory 250. In this instance, when the integral image 130 is stored in the plurality of memory as described above, a number of clocks to read all integral values to be read may be reduced.

Also, the control unit 210 may provide the read integral values to a second ALU 260 to enable a required calculation to be performed. The second ALU 260 may be provided with the read integral values and calculate the sum of data within the ROI.

Figure 3:
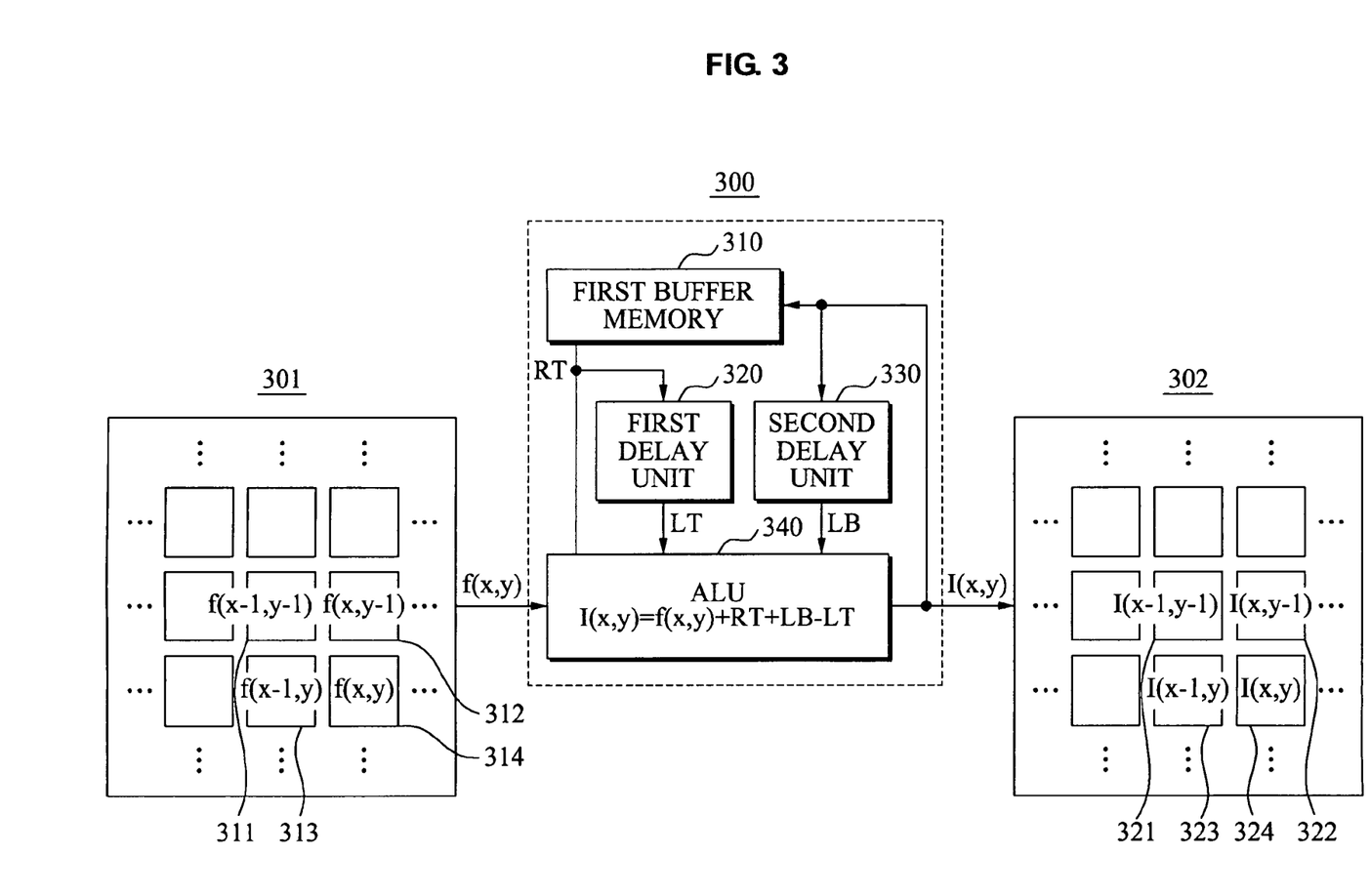
FIG. 3 is a diagram illustrating an image processing apparatus calculating an integral value according to example embodiments.

FIG. 3 is a diagram illustrating an image processing apparatus 300 calculating an integral value according to example embodiments.

Input image array data 301 may be provided. An integral value, $l(x, y)$, corresponding to a cell 314 may be calculated at a current clock. Integral values of a cell 311, a cell 312, and a cell 313 may correspond to a cell 321, a cell 322, and a cell 323 of an integral image 302, respectively. Also, the integral values may be previously calculated during previous clocks.

The integral value, $l(x, y)$, of the currently calculated cell 314 may be calculated as $l(x, y)=RT+LB-LT$. RT may denote the integral value of the cell 312, $l(x, y-1)$, and LB may denote the integral value of the cell 313, $l(x-1, y)$. Also, LT may denote the integral value of the cell 311, $l(x-1, y-1)$.

An ALU 340 may directly receive a data value of the cell 314, $f(x, y)$, and receive RT from a first buffer memory 310, LT from a first delay unit 320, and LB from a second delay unit 330. Accordingly, the ALU 340 may calculate the integral value of the cell 314, $l(x, y)=f(x, y)+RT+LB-LT$. Also, the ALU 340 may provide the integral value of the cell 314, $l(x, y)$, to the first buffer memory 310.

The first buffer memory 310 may temporarily store an integral value provided from the ALU 340 at every clock. Accordingly, RT, that is, the integral value of the cell 312, which is one row above the cell 314 calculated at the current clock, may be provided. According to example embodiments, the first buffer memory 310 may have a size to store of a same number of integral values as a number of columns in the input image array data 301.

The first delay unit 320 may receive and delay RT, and provide RT at a subsequent clock. Accordingly, an integral value, provided by the first delay unit 320 at a current clock, may be LT to a cell which is calculating an integral value.

Also, the second delay unit 330 may receive and delay the integral value $l(x, y)$, and provide the integral value $l(x, y)$ at a subsequent clock. Accordingly, an integral value provided at a current clock may be LB to a cell which is calculating an integral value.

Figure 4:
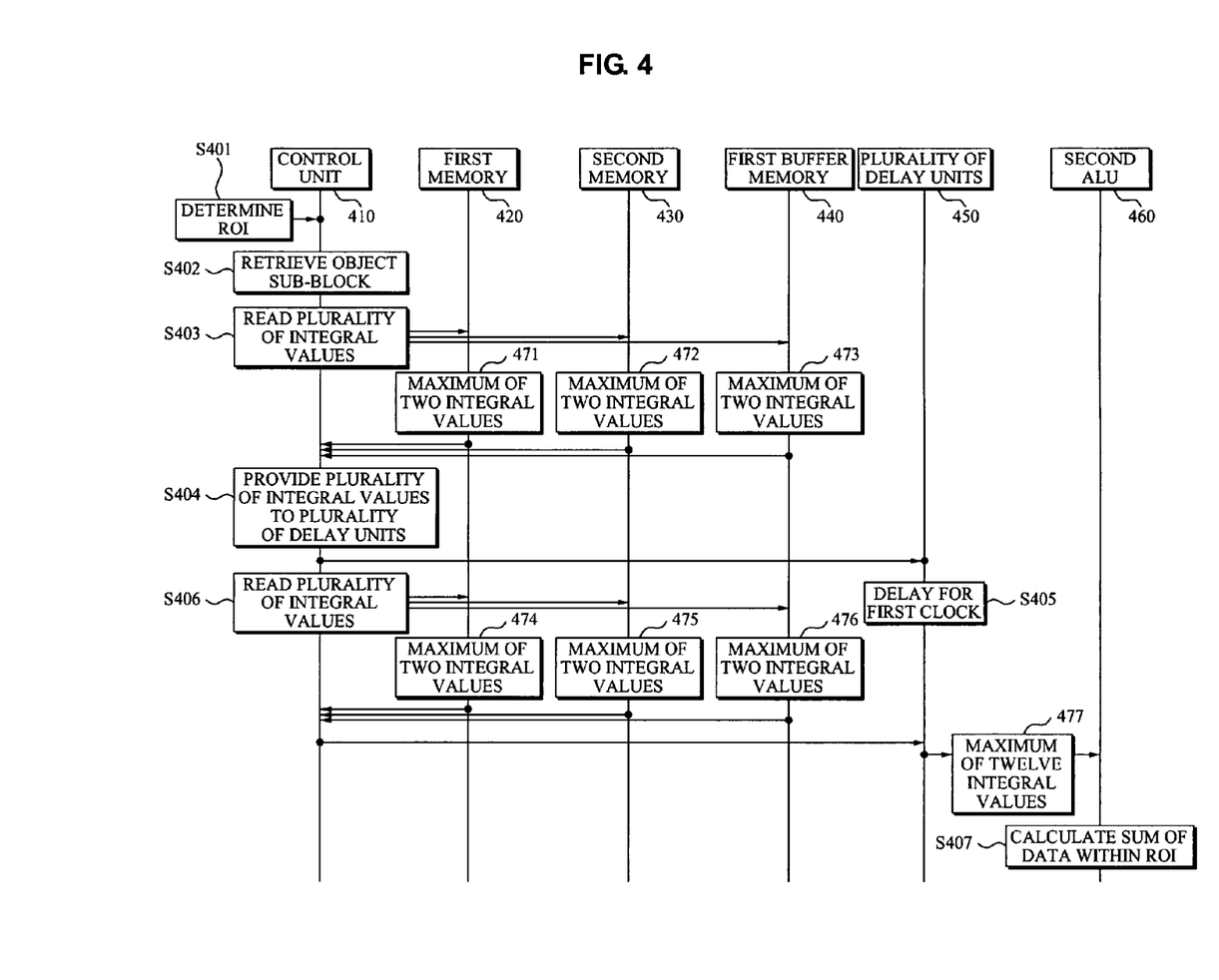
FIG. 4 is a flowchart illustrating a method of calculating a sum of data within a Region of Interest (ROI) according to example embodiments.

FIG. 4 is a flowchart illustrating a method of calculating a sum of data within an ROI according to example embodiments.

In operation S401, the ROI may be designated. A control unit 410 may determine which sub-block of a plurality of sub-blocks overlaps the ROI to retrieve an object sub-block overlapping the ROI. Here, overlapping may indicate sharing a cell.

In operation S402, the control unit 410 may read an integral value from the object sub-block from a first memory 420, a second memory 430, and a first buffer memory 440, respectively. According to example embodiments, two integral values may be read from a single memory at every single clock. Accordingly, in operation S403, first number of integral values 471, 472, and 473 may be read. The first number may be between one to six.

In operation S404, the control unit 410 may provide the first number of read integral values to a plurality of delay units 450.

In operation S405, the first number of read integral values may be delayed by the plurality of delay units 450 for one clock.

In operation S405, while the first number of read integral values is delayed for one clock, the control unit 410 may read a second number of integral values 474, 475, and 476. The second number may be between one and six.

Also, the control unit 410 may provide the integral values 477, read in two clocks, to a second ALU 460. In this instance, the integral values 477 may be between one to 12.

In operation S407, a sum of data within the ROI may be calculated using the read integral values. Although the number of integral values and a number of memories are designated as an example, the number of integral values and the number of memories may not be limited to the example embodiments, and changes may be made to the example embodiments without departing from the principles and spirit of the disclosure.

Figure 5:
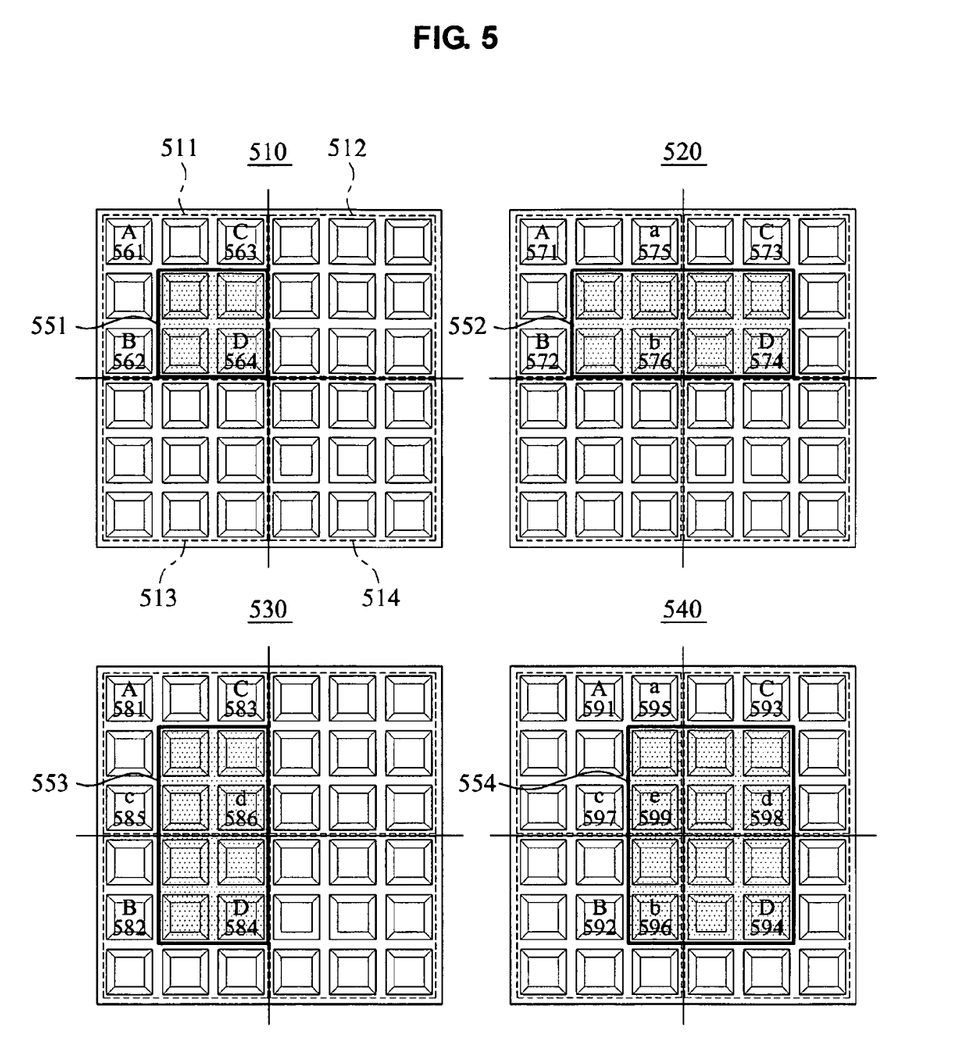
FIG. 5 is a diagram illustrating various types of ROIs for calculating a sum of data within an ROI according to example embodiments.

FIG. 5 illustrates various types of ROIs for calculating a sum of data within an ROI according to example embodiments.

As described above, the sum of data within the ROI may be a sum of all pixel values within the ROI of array data of an image. According to example embodiments, the sum of data within the ROI may be calculated using integral values.

In an integral image 510, an ROI 551 overlaps some of the cells a single sub-block 511. In this instance, a sum of data within the ROI 551 may be calculated as D−B−C+A. Here, A may denote an integral value of a cell 561, B may denote an integral value of a cell 562, C may denote an integral value of a cell 563, and D may denote an integral value of a cell 564.

Accordingly, when an integral image of the sub-block 511 is stored in a first memory 420 of FIG. 4, a control unit 410 may read the integral value A of the cell 561 in the sub-block 511, the integral value B of the cell 562, the integral value C of the cell 563, and the integral value D of the cell 564, from the first memory 420. When only two integral values may be read during one clock period, the four integral values, A, B, C, and D, may be read during two clock periods. In this instance, two integral values, read earlier, may be delayed through a plurality of delay units 450. Also, the control unit 410 may provide the four integral values A, B, C, and D to a second ALU 460.

In an integral image 520, an ROI 552 overlaps some cells of the sub-block 511 and a sub-block 512. In this instance, a sum of data within the ROI 552 may be calculated as (b−B−a+A)+(D−C). Here, A may denote an integral value of a cell 571, B may denote an integral value of a cell 572, C may denote an integral value of a cell 573, and D may denote an integral value of a cell 574. Also, a may denote an integral value of a cell 575, and b may denote an integral value of a cell 576.

According to example embodiments, an integral image of the sub-block 511 may be stored in the first memory 420, and an integral image of the sub-block 512 may be stored in a second memory 430. Also, an integral value of a bottom row of each of the sub-block 511 and the sub-block 512 may be stored in a first buffer memory 440.

In this instance, the control unit 410 may read the integral value A of the cell 571 and the integral value a of the cell 575 in the sub-block 511, from the first memory 420. Also, the control unit 410 may read the integral value C of the cell 573 and the integral value D of the cell 574 in the sub-block 512, from the second memory 430. Also, the control unit 410 may read the integral value B of the cell 572 and the integral value b of the cell 576 from the first buffer memory 440.

When two integral values reads during one clock period, the six integral values A, B, C, D, a, and b can be read during one clock. In this instance, the six integral values A, B, C, D, a, and b may not be delayed through the plurality of delay unit 450. Also, the control unit 410 may provide the six integral values A, B, C, D, a, and b, with the second ALU 460.

In an integral image 530, an ROI 553 overlaps some cells of the sub-block 511 and a sub-block 513. In this instance, a sum of data within the ROI 553 may be calculated as (d−C−c+A)+(D−B). Here, A may denote an integral value of a cell 581, B may denote an integral value of a cell 582, C may denote an integral value of a cell 583, and D may denote an integral value of a cell 584. Also, c may denote an integral value of a cell 585, and d may denote an integral value of a cell 586.

According to example embodiments, both an integral image of the sub-block 511 and an integral image of the sub-block 513 may be stored in the first memory 420. Integral values of bottom rows of the sub-block 511 and the sub-block 513 may be stored in the first buffer memory 440.

In this instance, the control unit 410 may read the integral value A of the cell 581 and the integral value C of the cell 583 in the sub-block 511, and the integral value B of the cell 582 and the integral value D of the cell 584, from the first memory 420. Also, the control unit 410 may read the integral value c of the cell 585 and the integral value d of the cell 586 from the first buffer memory 440.

When only two integral values may be read during one clock period, the six integral values A, B, C, D, c, and d may be read during two clocks period. In this instance, four integral values read earlier may be delayed through the plurality of delay units 450. Also, the control unit 410 may provide the six integral values A, B, C, D, c, and d to the second ALU 460.

In an integral image 540, an ROI 554 overlaps some cells of the sub-block 511, the sub-block 512, sub-block 513, and sub-block 514. In this instance, a sum of data within the ROI 554 may be calculated as (e−a−c+A)+(d−C)+(b−B)+(D). Here, A may denote an integral value of a cell 591, B may denote an integral value of a cell 592, C may denote an integral value of a cell 593, and D may denote an integral value of a cell 594. Also, a may denote an integral value of a cell 595, b may denote an integral value of a cell 596, c may denote an integral value of a cell 597, d may denote an integral value of a cell 598, and e may denote an integral value of a cell 599.

According to example embodiments, both an integral image of the sub-block 511 and an integral image of the sub-block 513 may be stored in the first memory 420. Also, both an integral image of the sub-block 512 and an integral image of the sub-block 514 may be stored in the second memory 430. Integral values of bottom rows of the sub-block 511, the sub-block 512, the sub-block 513, and the sub-block 514 may be stored in the first buffer memory 440.

In this instance, the control unit 410 may read the integral value A of the cell 591 and the integral value a of the cell 595 in the sub-block 511, and the integral value B of the cell 592 and the integral value b of the cell 596, from the first memory 420. Also, the control unit 410 may read the integral value C of the cell 593 in the sub-block 512 and the integral value D of the cell 594 from the second memory 430. Also, the control unit 410 may read the integral value c of the cell 597, the integral value e of the cell 599, and the integral value d of the cell 598 from the first buffer memory 440.

When only two integral values may be read during one clock period, the nine integral values A, B, C, D, a, b, c, d and e may be read in two clocks. In this instance, six integral values read earlier may be delayed through the plurality of delay units 450. Also, the control unit 410 may provide the nine integral values A, B, C, D, a, b, c, d and e with the second ALU 460.

The image processing method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing apparatus, comprising:
   a control unit to divide input image array data into a plurality of sub-blocks;
   a first arithmetic logic unit (ALU) to generate an integral image of at least one of the plurality of sub-blocks;
   a first memory and a second memory, wherein the control unit determines each of the plurality of sub-blocks to be included in any one of a first sub-block group and a second sub-block group, stores the integral image of each sub-block included in the first sub-block group on the first memory, and stores the integral image of each sub-block included in the second sub-block group on the second memory; and
   a first buffer memory to store an integral value of a bottom row of the integral image of each sub-block included in the first sub-block group, and an integral value of a bottom row of the integral image of each sub-block included in the second sub-block group.

2. The image processing apparatus of claim 1, further comprising:
   a second ALU to calculate a sum of data within a Region of Interest (ROI), the ROI being determined within the input image array data, the sum of data within the ROI being calculated as a sum of data values of each element in the ROI.

3. The image processing apparatus of claim 2, wherein the control unit retrieves an object sub-block including at least one of elements in the ROI, selects an element required to calculate the sum of data within the ROI from elements of the object sub-block, and reads an integral value of the required element from the first memory and the second memory, and the second ALU calculates the sum of data within the ROI based on the read integral value.

4. The image processing apparatus of claim 3, further comprising:
   a plurality of delay units,
   wherein the control unit provides a first number of integral values, read at a first clock, to the plurality of delay units, and reads a second number of integral values at a second clock, and the second ALU calculates the sum of data within the ROI based on the first number of integral values provided from the plurality of delay units and the second number of integral values read from the control unit, the first number and the second number being greater than one.

5. An image processing method, comprising:
   receiving image array data;
   dividing the image array data into a plurality of sub-blocks;
   generating an integral image of at least one of the plurality of sub-blocks;
   determining each of the plurality of sub-blocks to be included in any one of a first sub-block group and a second sub-block group;
   storing an integral image of each sub-block included in the first sub-block group on a first memory, and storing an integral image of each sub-block included in the second sub-block group on a second memory; and
   storing a bottom row of the integral image of each sub-block included in the first sub-block group, and a bottom row of the integral image of each sub-block included in the second sub-block group, in a first buffer memory structure.

6. The image processing method of claim 5, further comprising:
   selecting a Region of Interest (ROI) within the image array data; and
   calculating a sum of data within the ROI, the sum of data within the ROI being calculated as a sum of data values of each element in the ROI.

7. The image processing method of claim 6, wherein the calculating comprises:
   retrieving an object sub-block including at least one of elements in the ROI; and
   calculating and summing sum of data of a region overlapping the ROI in an integral image of the retrieved object sub-block.

8. A non-transitory computer-readable recording medium having stored thereon instructions for implementing an image processing method, the instructions comprising:
   receiving image array data;
   dividing the image array data into a plurality of sub-blocks;
   generating an integral image of at least one of the plurality of sub-blocks;
   determining each of the plurality of sub-blocks to be included in any one of a first sub-block group and a second sub-block group; and
   storing an integral image of each sub-block included in the first sub-block group on a first memory, and storing an integral image of each sub-block included in the second sub-block group on a second memory; and
   storing a bottom row of the integral image of each sub-block included in the first sub-block group, and a bottom row of the integral image of each sub-block included in the second sub-block group, in a first buffer memory.

9. The non-transitory computer-readable recording medium of claim 8, further comprising:
   selecting a Region of Interest (ROI) within the image array data; and
   calculating a sum of data within the ROI, the sum of data within the ROI being calculated as a sum of data values of each element in the ROI.

10. The non-transitory computer-readable recording medium of claim 9, further comprising:
    retrieving an object sub-block including at least one of elements in the ROI; and
    calculating and summing sum of data of a region overlapping the ROI in an integral image of the retrieved object sub-block.

* * * * *